(12) United States Patent
Sloan (10) Patent No.: US 8,698,805 B1
(45) Date of Patent: Apr. 15, 2014

(54) SYSTEM AND METHOD FOR MODELING AMBIENT OCCLUSION BY CALCULATING VOLUMETRIC OBSCURANCE

(75) Inventor: Peter-Pike Johannes Sloan, Cottonwood Heights, UT (US)

(73) Assignee: Disney Enterprises, Inc., Burbank, CA (US)

( * ) Notice: Subject to any disclaimer, the term of this patent is extended or adjusted under 35 U.S.C. 154(b) by 1209 days.

(21) Appl. No.: 12/550,179

(22) Filed: Aug. 28, 2009

Related U.S. Application Data (60) Provisional application No. 61/162,626, filed on Mar. 23, 2009.

(51) Int. Cl.
*G06T 15/50* (2011.01)

(52) U.S. Cl.
USPC .......................................... 345/426; 345/422

(58) Field of Classification Search
None
See application file for complete search history.

(56) References Cited

PUBLICATIONS

Filion, Effects & Techniques in SIGGRAPH 2008, ACM New York, NY, pp. 133-164.*
Mittring, Martin, Finding Next Gen: CryEngine 2 in SIGGRAPH 2007, ACM, New York, NY, pp. 97-121.*
Shanmugam, Hardware Accelerated Ambient Occlusion Techniques on GPUs, I3D '07 Proceedings of the 2007 Symposium on Interactive 3D graphics and games, ACM, New York, NY, pp. 73-80.*
Donnelly, Variance Shadow Maps, I3D '06, ACM, New York, NY, pp. 161-165.*
Bavoil, et al. "Image-Space Horizon-Based Ambient Occlusion," In SIGGRAPH '08: ACM SIGGRAPH 2008 talks, ACM, New York, NY, USA (2008).
Bunnell, Michael, "Dynamic Ambient Occlusion and Indirect Lighting," GPU Gems 2, Chapter 14, Addison Wesley (2005).
Donnelly, et al. "Variance Shadow maps, "In I3D '06: Proceedings of the 2006 symposium on Interactive 3D graphics and games, ACM, New York, NY, USA, pp. 161-165 (2006).
Filion, et al. "Effects & Techniques," In SIGGRAPH '08: ACM SIGGRAPH 2008 classes, ACM, New York, NY, USA, pp. 133-164 (2008).
Gooch, et al. "Interactive Technical Illustration," In I3D '99: Proceedings of the 1999 symposium on Interactive 3D Graphics, ACM, New York, NY, USA, pp. 31-38 (1999).
Kirk, et al. "Real-Time Ambient Occlusion for Dynamic Character Skins," In Proceedings of the ACM SIGGRAPH Symposium on Interactive 3D Graphics and Games, 2007.
Kontkanen, et al. "Ambient Occlusion for Animated Characters," In Rendering Techniques 2006 (Eurographics Symposium on Rendering), T. A.-M. Wolfgang Heidrich, Ed., Eurographics (2006).
Kontkanen, et al. "Ambient Occlusion Fields," In I3D'05: Proceedings of the 2005 symposium on Interactive 3D graphics and games, ACM, New York, NY, USA, pp. 41-48 (2005).

(Continued)

*Primary Examiner* — Hau Nguyen
*Assistant Examiner* — Ryan M Gray
(74) *Attorney, Agent, or Firm* — Patterson & Sheridan LLP (57) ABSTRACT

Embodiments of the invention provide techniques for calculating volumetric obscurance. Volumetric obscurance is an alternative approach to screen-space ambient occlusion that can be efficiently evaluated on graphics processing units (GPUs). In one embodiment, to calculate the volumetric obscurance at a particular pixel location, an integral is calculated that sums distances between depth values in a depth buffer relative to a surface of a sphere centered at the pixel location. In alternative embodiments, a statistical model of the depth buffer can be used to calculate the volumetric obscurance.

29 Claims, 7 Drawing Sheets

(56) References Cited

PUBLICATIONS

Landis, Hayden, "Production—Ready Global Illumination," Industrial Light + Magic. ACM SIGGRAPH 2002, Course #16 Notes, Jul. 2002.

Lauritzen, et al. "Layered Variance Shadow Maps," In GI '08: Proceedings of graphics interface 2008, Canadian Information Processing Society, Toronto, Ont., Canada, pp. 139-146 (2008).

Lehtinen, Jaakko, "A Framework for Precomputed and Captured Light Transport," ACM Transactions on Graphics 26, 4 (Oct. 2007).

Luft, et al. "Image Enhancement by Unsharp Masking the Depth Buffer," In SIGGRAPH '06: ACM SIGGRAPH 2006 Papers, ACM, New York, NY, USA, pp. 1206-1213 (2006).

Miller, Gavin, "Efficient Algorithms for Local and Global Accessibility Shading," In Proceedings of SIGGRAPH '94 (Orlando, Florida, Jul. 24-29, 1994), ACM Press, A. Glassner, Ed., Computer Graphics Proceedings, Annual Conference Series, ACM SIGGRAPH, pp. 319-326 (1994).

Mittring, Martin, "Finding Next Gen: CryEngine 2," In SIGGRAPH '07: ACM SIGGRAPH 2007 courses, ACM, New York, NY, USA, pp. 97-121 (2007).

Ren, et al. "Real-time Soft Shadows in Dynamic Scenes using Spherical Harmonic Exponentiation," ACM Transactions on Graphics 25, (Jul. 3), pp. 977-986 (2006).

Shanmugam, et al. "Hardware Accelerated Ambient Occlusion Techniques on GPUs," In I3D '07: Proceedings of the 2007 symposium on Interactive 3D graphics and games, ACM, New York, NY, USA, pp. 73-80 (2007).

Sloan, et al. "Precomputed Radiance Transfer for Real-Time Rendering in Dynamic, Low-Frequency Lighting Environments," ACM Transactions on Graphics 21, (Jul. 3), pp. 527-536 (2002).

Sloan, et al. "Image-Based Proxy Accumulation for Real-Time Soft Global Illumination," In Proceedings of the 15th Pacific Conference on Computer Graphics and Applications, IEEE Computer Society, pp. 1-9 (2007).

Williams, Lance, "Pyramidal Parametrics," SIGGRAPH Computer Graphics. 17, 3, pp. 1-11 (1983).

Zhukov, et al. "An ambient light illumination model," In Rendering Techniques '98, Springer-Verlag Wien New York, G. Drettakis and N. Max, Eds., Eurographics, pp. 45-56 (1998).

Bavoli, et al. "Screen Space Ambient Occlusion," NVIDIA, Sep. 2008.

Kajalin, Vladimir. "Screen-Space Ambient Occlusion," Shader X7: Advanced Rendering Techniques, Ch. 6.1 (2009).

Bavoil, et al. "Image-Space Horizon-Based Ambient Occlusion," Shader X7: Advanced Rendering Techniques, Ch. 6.2 (2009).

Shopf, et al. "Deferred Occlusion from Analytic Surfaces," Shader X7: Advanced Rendering Techniques, Ch. 6.3 (2009).

Briney, et al. "Fast Fake Global Illumination," Shader X7: Advanced Rendering Techniques, Ch. 6.4 (2009).

Ki, Hyunwoo, "Real-Time Subsurface Scattering Using Shadow Maps," Shader X7: Advanced Rendering Techniques, Ch. 6.5 (2009).

Szecsi, Laszlo, "Instant Radiosity with GPU Photon Tracing and Approximate Indirect Shadows," Shader X7: Advanced Rendering Techniques, Ch. 6.6 (2009).

Pesce, Angelo, "Variance Methods for Screen-Space Ambient Occlusion," Shader X7: Advanced Rendering Techniques, Ch. 6.7 (2009).

Bookout, et al. "Per-Pixel Ambient Occlusion Using Geometry Shaders," Shader X7: Advanced Rendering Techniques, Ch. 6.8 (2009).

Ruiz, et al. "Obscurance-based Volume Rendering Framework," Proceedings of IEEE/EG International Symposium on Volume and Point-Based Graphics, Aug. 2008, Los Angeles, CA, USA, pp. 113-120.

\* cited by examiner

SYSTEM AND METHOD FOR MODELING AMBIENT OCCLUSION BY CALCULATING VOLUMETRIC OBSCURANCE

CROSS-REFERENCE TO RELATED APPLICATIONS

This application claims benefit of U.S. provisional patent application Ser. No. 61/162,626 filed on Mar. 23, 2009, which is hereby incorporated herein by reference.

BACKGROUND

1. Field of the Invention

The present invention relates to the field of computer graphics and, in particular, to a system and method for calculating volumetric obscurance.

2. Description of the Related Art

Obscurance and ambient occlusion (AO) are popular techniques in both film and games that model how ambient light is shadowed. These techniques provide a way to approximate the lighting on a surface without performing computationally expensive operations such as radiosity, global illumination, or full ray tracing.

Figure 1A:
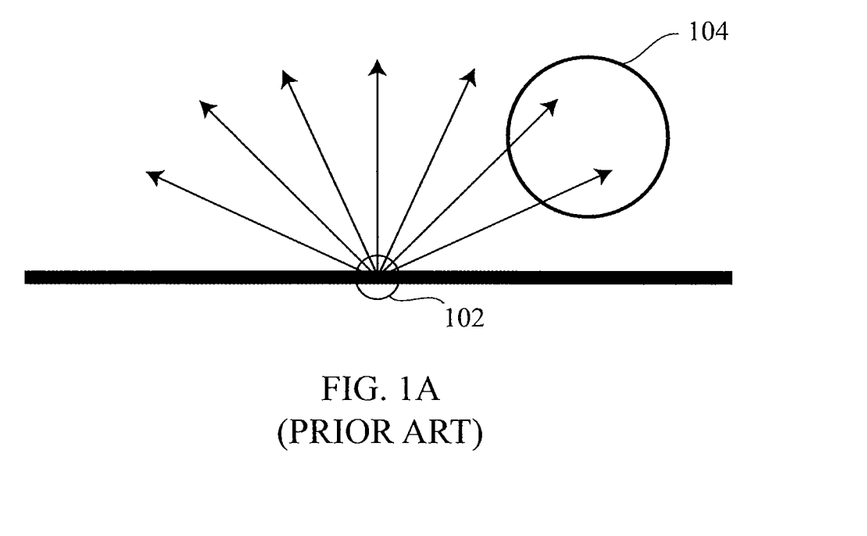
FIG. 1A is a conceptual diagram illustrating a technique for calculating ambient occlusion based on projecting rays, according to the prior art.

One prior art technique for calculating ambient occlusion involves projecting rays from a point on a surface. FIG. 1A is a conceptual diagram illustrating a technique for calculating ambient occlusion based on projecting rays, according to the prior art. In various implementations, the rays can extend from a point 102 on surface for a finite length or to infinity. The technique involves determining a ratio of the number of rays that hit another object 104 to the number of rays that do not hit any objects. The greater the ratio, the greater the occlusion of the point 102. For example, if 75% of the rays do not intersect any objects and 25% of the rays do interest an object, then the lighting value for the point 102 may be scaled down by 75% or by some other factor. Additionally, weight values may be applied to the ratio calculation so that rays that intersect objects at a greater distance from point 102 have less impact on the ambient occlusion value. Although this technique provides adequate results, projecting rays is very computationally expensive and is not readily adaptable to real-time applications, such as video and games.

Figure 1B:
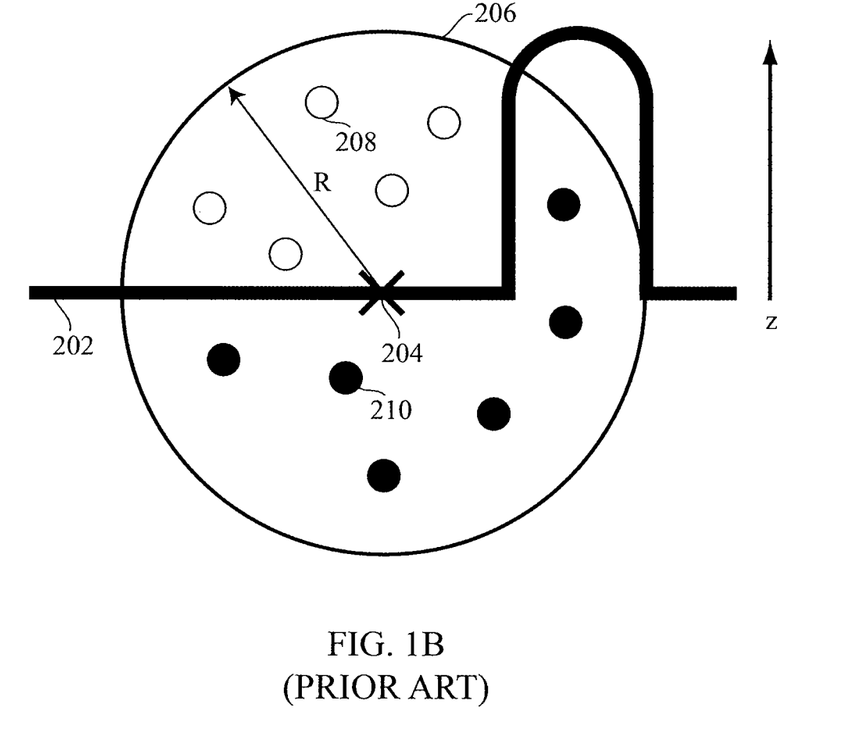
FIG. 1B is a conceptual diagram illustrating a technique for calculating point sampling-based screen space ambient occlusion, according to the prior art.

Other prior art techniques involve point sampling-based screen space ambient occlusion. FIG. 1B is a conceptual diagram illustrating a technique for calculating point sampling-based screen space ambient occlusion, according to the prior art. A screen space depth buffer (i.e., a "z buffer") 202 is provided for each pixel location in the image relative to an observer 212. For a given pixel location 204, a sphere 206 having a radius R is drawn around the pixel location 204. Then, the sphere 206 is sampled at various points. FIG. 1B shown only a two-dimensional (2D) cross-section of the sphere 206. The depth value of each sample point is compared to the depth value at that particular pixel location in the depth buffer 202. A ratio is then calculated based on the number of samples within the sphere 206 that are "in front" of the corresponding depth buffer value and the number of samples within the sphere 206 that are "behind" the corresponding depth buffer value. As shown in FIG. 1B, the samples 208 (illustrated as empty circles) are in front of the depth buffer 202 at the corresponding pixel locations; whereas, the samples 210 (illustrated as filled circles) are behind the depth buffer 202 at the corresponding pixel locations. A ratio of these points is then used to scale the lighting value at the pixel location 204. Weighting of point samples may also be used so that points closer to the pixel location 204 affect the result more than point samples further away from the pixel location 204. However, the screen space ambient occlusion technique suffers from several drawbacks. First, under-sampling can result in a coarse or noisy image. A blurring operation is typically performed to smooth out the results of the point sampling-based screen space ambient occlusion technique. The blurring operation typically must respect edges so that only those neighboring pixels that have a similar depth/normal are blurred. Performing the blurring operation adds additional computational complexity to this technique. Second, artifacts can result since the depth buffer 202 is typically a single-layer depth buffer that does not take into account multiple depth layers.

As the foregoing illustrates, there is a need in the art for an improved technique for calculating ambient occlusion that overcomes the limitations of conventional approaches.

SUMMARY

Embodiments of the invention provide techniques for calculating volumetric obscurance. Volumetric obscurance is an alternative approach to screen-space ambient occlusion that can be efficiently evaluated on GPUs. In one embodiment, to calculate the volumetric obscurance at a particular pixel location, an integral is calculated that sums distances between depth values in a depth buffer relative to a surface of a sphere centered at the pixel location. In alternative embodiments, a statistical model of the depth buffer can be used to calculate the volumetric obscurance.

One embodiment of the invention provides a computer-implemented method for modeling ambient occlusion. The method includes receiving a first pixel location associated with a first depth value stored in a depth buffer; determining a volume; determining depth values stored in the depth buffer for one or more pixel locations within a screen-space projection of the volume; calculating an integral value of distances between depth values at each of the one or more pixel locations and the volume centered at the first pixel location; adjusting a pixel value at the first pixel location based on the integral value; and displaying on a display device or storing in a memory a pixel that is associated with the first pixel location and is based on the pixel value.

Another embodiment of the invention provides a computer-implemented method for modeling ambient occlusion in a graphics scene. The method includes receiving a first pixel location associated with a first depth value stored in a depth buffer; determining a volume; determining, for each of one or more pixel locations within a screen-space projection of the volume, a statistical model of depth at an area associated with each of the one or more pixel locations based on one or more depth values stored in the depth buffer; calculating an integral based on the one or more statistical models; and displaying on a display device or storing in a memory a pixel value that is associated with the first pixel location and is based on the integral.

Advantageously, embodiments of the invention provide a comparable visual result more efficiently when compared to using conventional techniques.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention provide techniques for calculating volumetric obscurance. Volumetric obscurance is an alternative approach to screen-space ambient occlusion that can be efficiently evaluated on GPUs. In one embodiment, to calculate the volumetric obscurance at a particular pixel location, an integral is calculated that sums distances between depth values in a depth buffer relative to a surface of a sphere centered at the pixel location. In alternative embodiments, a statistical model of the depth buffer can be used to calculate the volumetric obscurance.

As described above, obscurance and ambient occlusion techniques are used to simulate a simple model of visibility for ambient light. The results of these techniques provide an image with a softer and more realistic look, and may provide important visual contact cues. While implementing conventional techniques for off-line rendering or static objects and scenes is relatively straightforward, doing so for dynamic objects has proven to be difficult. Some recent games use point sampling-based screen space ambient occlusion (as described in FIG. 1B), but the results suffer from performance and under sampling problems. To solve these problems, embodiments of the invention provide a technique that generates plausible results without under-sampling issues.

In various embodiments, volumetric obscurance, as used herein, at a point P is defined as the integral of occupancy of space around the point P multiplied by a compact kernel. In one embodiment, the occupancy function has a value of zero (0) for points inside an object/matter and has a value of one (1) otherwise. While the approximations resulting from volumetric obscurance do not correspond to any physical process or special case of global illumination, such as ray-based ambient occlusion, this approach still generates very plausible results. In one embodiment, volumetric obscurance can be computed efficiently for a particular pixel location by integrating the distance between a depth buffer and a sphere centered at the pixel location. In other embodiments, volumetric obscurance can be computed efficiently by querying a simple statistical model of the scenes depth buffer, effectively sampling areas of the screen and integrating against a volumetric piece of the integral. Compelling results can be generated even with a single sample.

Ray-based obscurance A for a point P may be defined using the following equation:

$$A(P) = \frac{1}{\pi} \int_\Omega \rho(d(P, \omega))\cos\theta d\omega \qquad \text{(Equation 1)}$$

where $\rho$ is a fall-off function, d is the distance to the first intersection, $\theta$ is the angle between the surface normal at P and the direction w, and the integral is over the hemisphere centered at P. The fall-off function $\rho$ may start at zero (0) and converge to one (1) at some fixed distance, which enables the rays to have a limited length. Ambient occlusion is a special case of obscurance where the fall-off function $\rho$ is zero for any value besides infinity. While both of these techniques model ambient illumination, ambient occlusion is the transfer coefficient that maps direct lighting to outgoing radiance for a diffuse surface.

The primary difficulty in mapping these conventional techniques to parallel computing platforms, such graphics processing units (GPUs), is that the queries involved are over ray directions, which does not interact well with the traditional rasterization framework.

To overcome some of these drawbacks, embodiments of the invention provide techniques for calculating a "volumetric obscurance." Volumetric obscurance V at point P, in some embodiments, is defined using the following equation:

$$V(P) = \int \rho(d(P,x))O(x)dx \qquad \text{(Equation 2)}$$

where the integral is over a three-dimensional (3D) neighborhood around point P, and O(x) is an occupancy function having a value of zero (0) if there is matter at x and having a value of one (1) otherwise. In some embodiments, the fall-off function $\rho$ is defined to have a value of one (1) at a distance of zero (0) and falls off to zero (0) at a fixed distance. In various embodiments, a constant function or a quadratic function that falls off to zero (0) at a finite distance may be used. Volumetric obscurance provides a volumetric generalization of obscurance, and may, in some embodiments, have the same results when any ray originating from point P only intersects a single solid surface.

Figure 2:
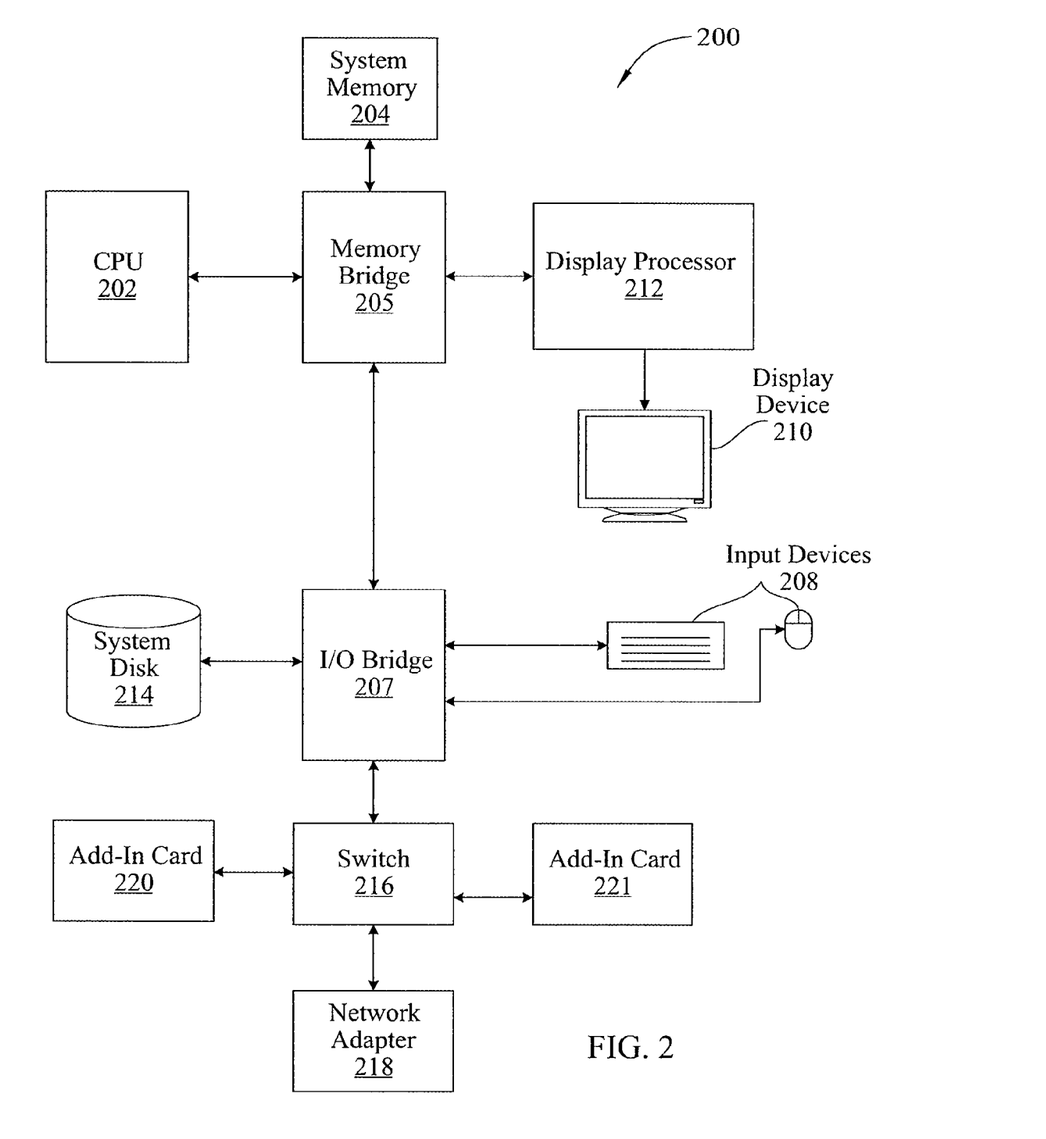
FIG. 2 is a block diagram of a system configured to implement one or more aspects of the present invention.

FIG. 2 is a block diagram of a system 200 configured to implement one or more aspects of the present invention. System 200 may be a computer workstation, personal computer, video game console, personal digital assistant, rendering engine, or any other device suitable for practicing one or more embodiments of the present invention.

As shown, system 200 includes a central processing unit (CPU) 202 and a system memory 204 communicating via a bus path that may include a memory bridge 205. CPU 202 includes one or more processing cores, and, in operation, CPU 202 is the master processor of system 200, controlling and coordinating operations of other system components. System memory 204 stores software applications and data for use by CPU 202. CPU 202 runs software applications and optionally an operating system. Memory bridge 205, which may be, e.g., a Northbridge chip, is connected via a bus or other communication path (e.g., a HyperTransport link) to an I/O (input/output) bridge 207. I/O bridge 207, which may be, e.g., a Southbridge chip, receives user input from one or more user input devices 208 (e.g., keyboard, mouse, joystick, digitizer tablets, touch pads, touch screens, still or video cameras, motion sensors, and/or microphones) and forwards the input to CPU 202 via memory bridge 205.

A display processor 212 is coupled to memory bridge 205 via a bus or other communication path (e.g., a PCI Express, Accelerated Graphics Port, or HyperTransport link); in one embodiment display processor 212 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 204.

Display processor 212 periodically delivers pixels to a display device 210 (e.g., a screen or conventional CRT, plasma, OLED, SED or LCD based monitor or television). Additionally, display processor 212 may output pixels to film recorders adapted to reproduce computer generated images on photographic film. Display processor 212 can provide display device 210 with an analog or digital signal.

A system disk 214 is also connected to I/O bridge 207 and may be configured to store content and applications and data for use by CPU 202 and display processor 212. System disk 214 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 216 provides connections between I/O bridge 207 and other components such as a network adapter 218 and various add-in cards 220 and 221. Network adapter 218 allows system 200 to communicate with other systems via an electronic communications network, and may include wired or wireless communication over local area networks and wide area networks such as the Internet.

Other components (not shown), including USB or other port connections, film recording devices, and the like, may also be connected to I/O bridge 207. For example, an audio processor may be used to generate analog or digital audio output from instructions and/or data provided by CPU 202, system memory 204, or system disk 214. Communication paths interconnecting the various components in FIG. 2 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 212 incorporates circuitry optimized for graphics and video processing, including, for example, video output circuitry, and constitutes a graphics processing unit (GPU). In another embodiment, display processor 212 incorporates circuitry optimized for general purpose processing. In yet another embodiment, display processor 212 may be integrated with one or more other system elements, such as the memory bridge 205, CPU 202, and I/O bridge 207 to form a system on chip (SoC). In still further embodiments, display processor 212 is omitted and software executed by CPU 202 performs the functions of display processor 212.

Pixel data can be provided to display processor 212 directly from CPU 202. In some embodiments of the present invention, instructions and/or data representing a scene are provided to a render farm or a set of server computers, each similar to system 200, via network adapter 218 or system disk 214. The render farm generates one or more rendered images of the scene using the provided instructions and/or data. These rendered images may be stored on computer-readable media in a digital format and optionally returned to system 200 for display. Similarly, stereo image pairs processed by display processor 212 may be output to other systems for display, stored in system disk 214, or stored on computer-readable media in a digital format.

Alternatively, CPU 202 provides display processor 212 with data and/or instructions defining the desired output images, from which display processor 212 generates the pixel data of one or more output images, including characterizing and/or adjusting the offset between stereo image pairs. The data and/or instructions defining the desired output images can be stored in system memory 204 or graphics memory within display processor 212. In an embodiment, display processor 212 includes 3D rendering capabilities for generating pixel data for output images from instructions and data defining the geometry, lighting shading, texturing, motion, and/or camera parameters for a scene. Display processor 212 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 204 is connected to CPU 202 directly rather than through a bridge, and other devices communicate with system memory 204 via memory bridge 205 and CPU 202. In other alternative topologies display processor 212 is connected to I/O bridge 207 or directly to CPU 202, rather than to memory bridge 205. In still other embodiments, I/O bridge 207 and memory bridge 205 might be integrated into a single chip. The particular components shown herein are optional; for instance, any number of add-in cards or peripheral devices might be supported. In some embodiments, switch 216 is eliminated, and network adapter 218 and add-in cards 220, 221 connect directly to I/O bridge 207.

Figure 3:
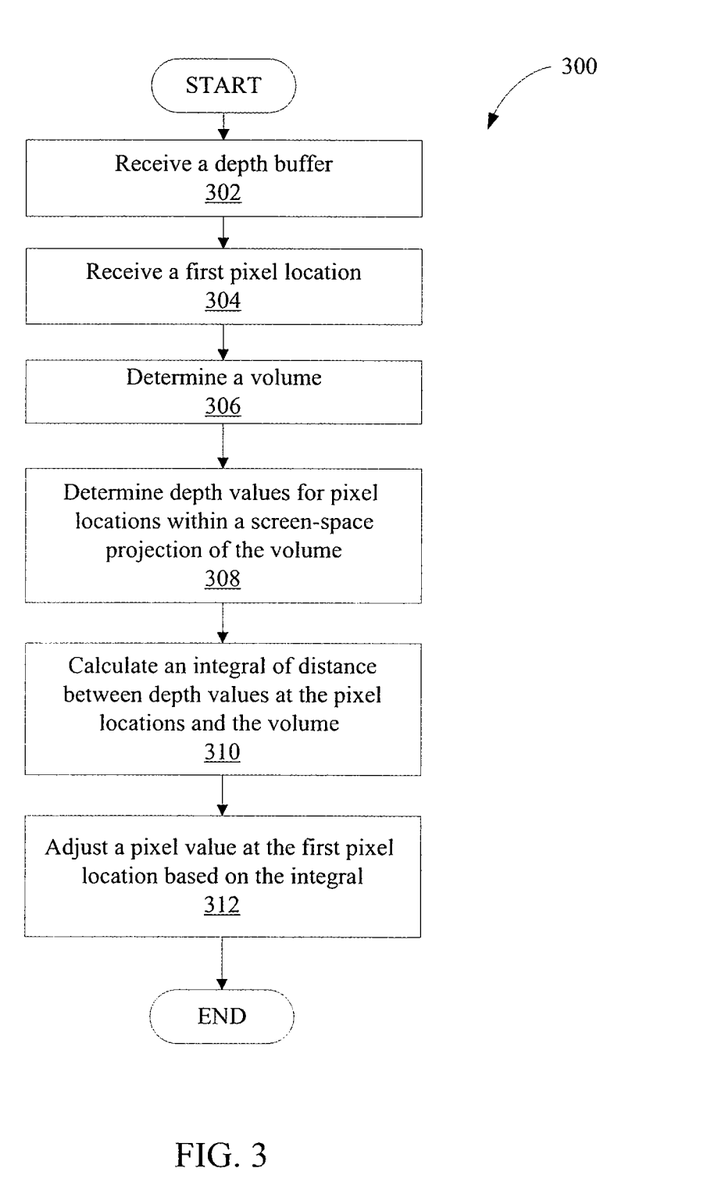
FIG. 3 is a flow diagram of method steps for calculating volumetric obscurance based on line samples, according to one embodiment of the invention.

FIG. 3 is a flow diagram of method steps for calculating volumetric obscurance based on line samples, according to one embodiment of the invention. Persons skilled in the art will understand that, even though the method 300 is described in conjunction with the system of FIG. 2, any system configured to perform the method steps, in any order, is within the scope of embodiments of the invention.

As shown, the method 300 begins at step 302, where a processor receives the depth buffer associated with an image. A depth buffer stores depth values for each pixel location in the image. In one embodiment, the depth buffer includes a single value for each pixel location that defines the depth in screen space at that particular pixel location. At step 304, the processor receives a first pixel location. The first pixel location may be any pixel location in the image. At step 306, the processor determines a volume to be used to calculate the volumetric obscurance at the first pixel location. In one embodiment, the volume comprises a sphere centered at the first pixel location. The sphere may be associated with a radius. In one embodiment, the radius is a fixed value defined by a user input. Alternatively, the radius may be set to a default value that can be changed by user input. In alternative embodiments, the radius is a function of an object space radius and the depth stored in the depth buffer at the first pixel location. In still further embodiments, the volume comprises a non-spherical volume.

At step 308, the processor determines depth values stored in the depth buffer for one or more pixel locations within a screen-space projection of the volume. In one embodiment, the processor determines the value for all pixel locations within the screen-space projection of the volume. In alternative embodiments, the processor may determine the depth values for only a sparse set of pixel locations within the screen-space projection of the volume. For example, when the volume is a sphere, the screen-space projection of the volume comprises a circle. Depth values may then be determined for pixel locations with the circle.

At step 310, for each pixel location that a depth value is determined, the processor calculates an integral of the distance between the depth values at the pixel locations and the volume centered at the first pixel location and the depth values determined for the pixel locations. The sum of the distances between the depth values and the volume approximates the occlusion at the first pixel location. In some embodiments, a weight function may be applied so that the distance between a particular pixel location and the sphere influences the result more when the particular pixel location is closer to the first pixel location. In some embodiments, the weight values may be based on a density function.

At step 312, the processor adjusts a pixel value at the first pixel location based on the value of the integral. In one embodiment, the pixel value comprises a lighting value. Accordingly, the greater the value of the integral, the less occlusion is present at the first pixel location. Thus, if the first pixel location is less occluded, then the pixel value would be greater relative to another pixel location that is more occluded.

Although the method 300 is described for a single pixel location, the method 300 can be repeated for multiple pixel locations in the image, including all pixel locations.

Figure 4:
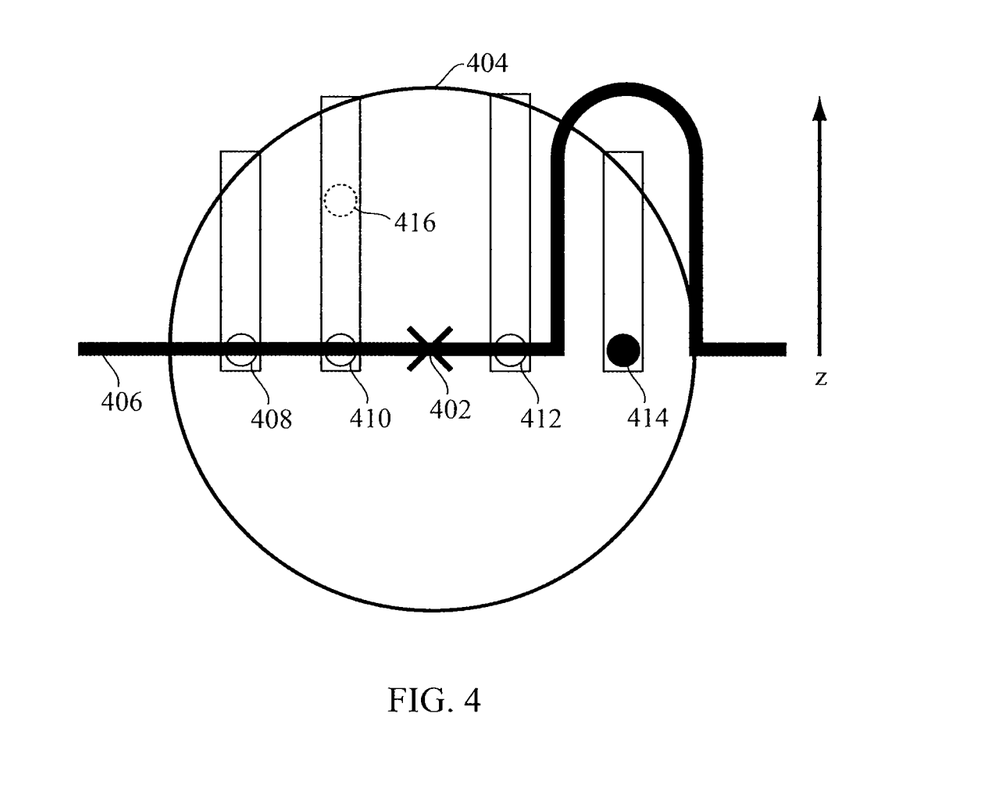
FIG. 4 is a conceptual diagram illustrating a technique for calculating volumetric obscurance using line samples, according to one embodiment of the invention.

FIG. 4 is a conceptual diagram illustrating a technique for calculating volumetric obscurance using line samples, according to one embodiment of the invention. As shown, a sphere-shaped volume 404 is centered around pixel location 402. A depth buffer 406 stores depth values at pixel locations included in the image relative to an observer 418. The depth values at pixel locations 408, 410, 412, and 414 are determined. A distance value is calculated between each of pixel locations 408, 410, 412, and 414 and the volume 404, respectively. Integrating these distance values provides an approximation of the occlusion at pixel location 402. This technique provides better results than screen space point sampling, since the pixel locations are not under-sampled. As described, in some embodiments, all of the pixel locations within a projection of the volume may contribute the integrated sum. This technique provides much more efficient results compared to point sampling-based screen space techniques since all of the values contribute non-duplicate information. For example, using the point sampling-based screen space technique, a particular object space point 416 within the volume that lies "above" the same pixel location as another sampled object space point (e.g., point 410) provides no additional information, i.e., the occlusion or un-occlusion at the particular pixel location is already known from point 410. Accordingly, the line sampling technique described herein, which is based on depth values stored in the depth buffer, does not suffer from the same under-sampling artifacts as point sampling-based screen space occlusion techniques.

In addition, alternative embodiments of the invention provide for calculating volumetric obscurance based on a statistical model. Instead of sampling the depth buffer at pixel locations within the screen-space projection of the volume, embodiments of the invention provide for building a statistical representation over the area associated with each sample. For example, in one embodiment, the statistical model involves the mean and variance of the depth values over a given area. As an example, the mean and variance can be computed from the first two values of the depth buffer. Given a depth buffer, the average depth in the area can be calculated, $M_1 = avg(z)$. Then, an average of the depth squared can be calculated, $M_2 = avg(z^2)$. The variance, $\sigma^2$, can be calculated by computing $M_2 - (M_1)^2$, where $\sigma$ is the standard deviation.

In one embodiment, a pre-filtered representation of the screen is computed to enable efficient evaluation for an arbitrary area in screen space. While mip-mapping is possible, the technique used in one embodiment of the invention differs from traditional texture mapping, since the technique magnifies the texture depending on the radius of influence. Trilinear reconstruction has significant artifacts at low sampling rates, thus embodiments of the invention use an image pyramid, where the top level has been filtered using a separable Gaussian filter and then a mip-map is constructed below the top level. The level-of-detail (LOD) used to query the mip-map may be biased to compensate for this filtering and the coarser levels may use wider spaced taps to compensate as well. This results in a higher quality reconstruction with reasonable results, even for a single sample. For example, biasing by two mip levels seems to be a good performance/quality trade-off. Given a down-sampling filter used to generate the mip-map, embodiments of the invention can solve for G at multiple powers of two (2), e.g., four (4). Embodiments of the invention fit a linear function that determines $\log_2(\sigma)$ as a function of the desired LOD bias by down-sampling and then linearly up-sampling multiple one-dimensional signals with a single non-zero value at multiple translations, and then brute force optimizing for $\sigma$ over the multiple translations.

Figure 5A:
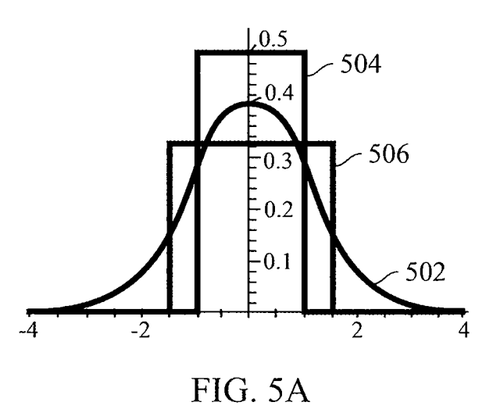
FIGS. 5A-5B illustrate distribution functions, according to embodiments of the invention.
Figure 5B:
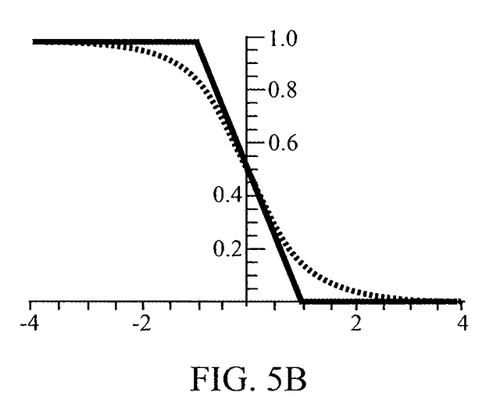

When integrating a column, instead of having a step function from a single depth value, some embodiments provide a distribution of depths. Convolving this distribution with a step function, provides a cumulative distribution function (CDF) of the depths, the percentage of un-occluded space in the given sample in front of the query point. FIGS. 5A-5B illustrate distribution functions, according to embodiments of the invention. As shown, distribution function 502 illustrates a Gaussian distribution, distribution function 504 illustrates a constant approximation of the Gaussian distribution, and distribution function 504 illustrates an optimal constant approximation of the Gaussian distribution. For example, the distribution function 504 can be calculated as $1.53817\sigma$. FIG. 5B illustrates the integrated visibility function. In some embodiments, an approximation, e.g., distribution function 504 or distribution function 506, is accurate enough to achieve adequate results. The approximate distribution function 504 includes a constant function plus-or-minus one standard deviation from the mean depth, which makes the CDF a linear function.

Figure 6:
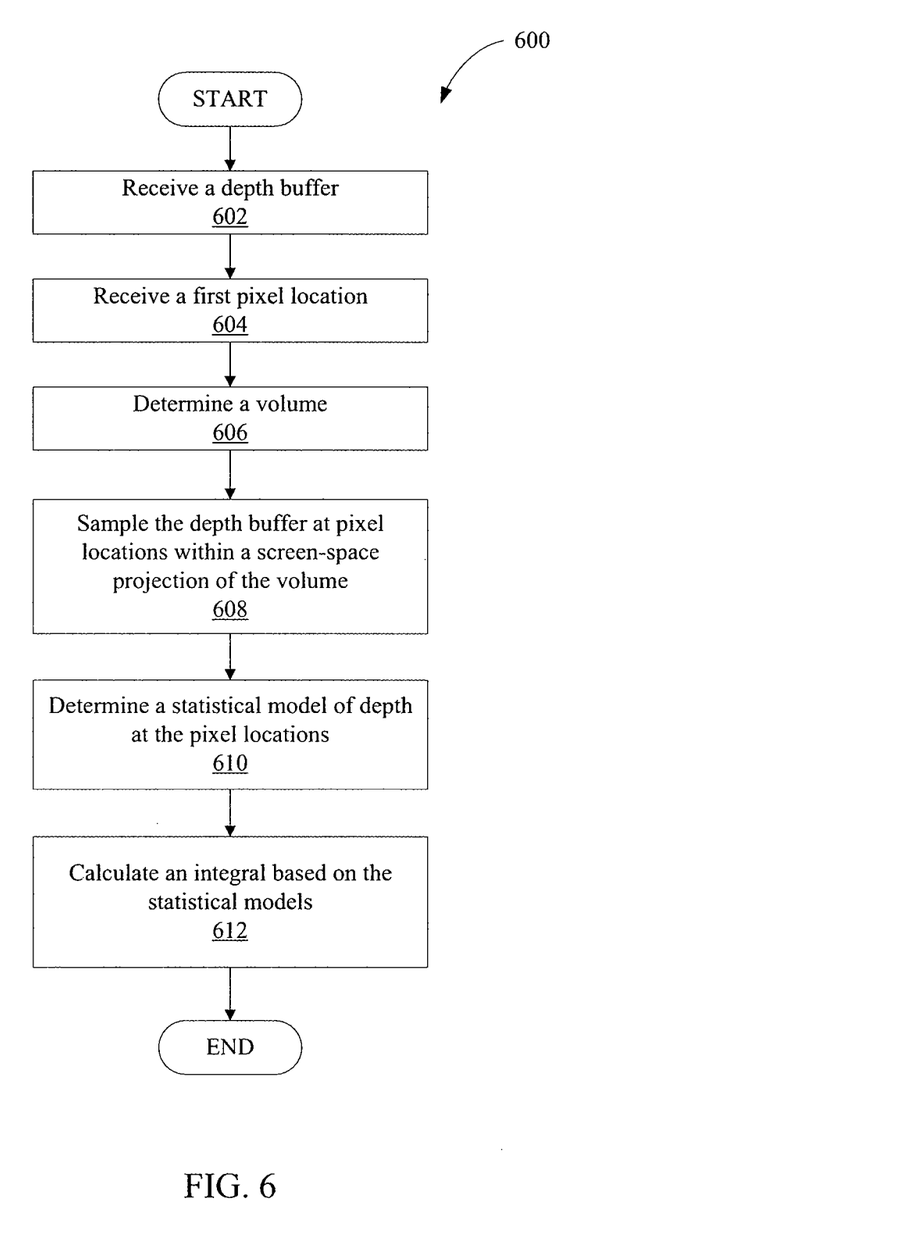
FIG. 6 is a flow diagram of method steps for calculating volumetric obscurance based on a statistical model, according to one embodiment of the invention.

FIG. 6 is a flow diagram of method steps for calculating volumetric obscurance based on a statistical model, according to one embodiment of the invention. Persons skilled in the art will understand that, even though the method 600 is described in conjunction with the system of FIG. 2, any system configured to perform the method steps, in any order, is within the scope of embodiments of the invention.

As shown, the method 600 begins at step 602, where a processor receives the depth buffer associated with an image. A depth buffer stores depth values for each pixel location in the image. In one embodiment, the depth buffer includes a single value for each pixel location that defines the depth in screen space at that particular pixel location. At step 604, the processor receives a first pixel location. The first pixel location may be any pixel location in the image. At step 606, the processor determines a volume to be used to calculate the volumetric obscurance at the first pixel location. In one embodiment, the volume comprises a sphere centered at the first pixel location. The sphere may be associated with a radius. In one embodiment, the radius is a fixed value defined by a user input. Alternatively, the radius may be set to a default value that can be changed by user input. In alternative embodiments, the radius is a function of an object space radius and the depth stored in the depth buffer at the first pixel location. In still further embodiments, the volume comprises a non-spherical volume.

At step 608, the processor samples the depth buffer at a pixel location within a screen-space projection of the volume. At step 610, the processor determines a statistical model of the depth at an area associated with the pixel location within the screen-space projection of the volume. In one embodiment, the statistical model comprises mean and variance of depth values over a particular area of pixel locations centered at the pixel location within the screen-space projection of the volume.

At step 612, the processor calculates an integral based on the statistical model. Although the method 600 is described for a single pixel location, the method 600 can be repeated for multiple pixel locations in the image, including all pixel locations. Additionally, the method 600 is described by sampling a single pixel location within the screen-space projection of the volume and calculating the statistical model at the single pixel location. Some embodiments provide for sampling multiple pixel locations within the screen-space projection of the volume and calculating the statistical model at each of the multiple pixel locations.

In addition, in some embodiments, one of the limitations of screen space algorithms is that while there is no occlusion in front of a value in the depth buffer, the algorithms do not take into account what happens behind the value in the depth buffer. Accordingly, embodiments of the invention take another approximation and assume that all surfaces have a fixed depth. This approximation can be achieved by replacing the step function in the convolution shown in FIGS. 5A-5B with some model of occlusion behind the front-most surface. For example, if $C_P(z)$ is the integrated visibility function based on the statistical model at point P, then having finite thickness amounts to adding $\int (1-C_P(z+T))\rho(d(P,x))dx$, where T is the thickness. This additional approximation effectively adds back the visible region behind the geometry in the frame buffer. This can be expressed as $\int \rho dz - \int C_P(z+T)\rho dz$ by computing a second evaluation of the integral used in the general case. More complex models of object thickness and occluded objects are also within the scope of embodiments of the invention.

Embodiments of the invention can be implemented in shader code on GPU, where the GPU is the processor that executes the steps outlined in FIG. 4 and FIG. 6. Additionally, various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

In sum, embodiments of the invention provide techniques for calculating volumetric obscurance. Volumetric obscurance is an alternative approach to screen-space ambient occlusion that can be efficiently evaluated on GPUs. Additionally, using a statistical model of the depth buffer alleviates the under-sampling problems that plague prior techniques and enables an interesting result with only a single sample. Qualities of ambient occlusion, such as darkening at concave creases, darkening near contact, and darkening in fine-scale features are preserved. Moreover, using a small radius allows embodiments of the invention to accentuate fine features, but has more subtle contact/depth discontinuity shading; whereas, using a larger radius makes some of the effects more pronounced, but loses the fine scale features. These results can be combined to product a better result, e.g., using a product of the two results or a minimum operator. Varying the radius spatially to stylize the scene is also within the scope of embodiments of the invention.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for modeling ambient occlusion, the method comprising:
   receiving a first pixel location associated with a first depth value stored in a depth buffer;
   determining a volume, wherein the volume comprises a sphere centered at the first pixel location;
   determining depth values stored in the depth buffer for one or more pixel locations within a screen-space projection of the volume;
   applying a weight value based on a density function to the depth values for one or more pixel locations based on their distance from the first pixel location;
   calculating a distance using the depth values between each of the one or more pixel locations on the screen space projection and a boundary of the volume centered at the first pixel location;
   calculating an integral value of the distances between depth values at each of the one or more pixel locations and the volume centered at the first pixel location;
   adjusting a pixel value at the first pixel location based on the integral value; and
   displaying on a display device or storing in a memory a pixel that is associated with the first pixel location and is based on the pixel value.

2. The method of claim 1, wherein the pixel value comprises a lighting value.

3. The method of claim 1, wherein the one or more pixel locations within the screen-space projection of the volume include all pixel locations within the screen-space projection of the volume.

4. The method of claim 1, wherein the one or more pixel locations within the screen-space projection of the volume include a sparse sampling of the pixel locations within the screen-space projection of the volume.

5. The method of claim 1, wherein the volume is based on a depth value stored in the depth buffer at the first pixel location.

6. The method of claim 1, wherein the distance between the depth value at a second pixel location and the volume has a greater weight than the distance between the depth value at a third pixel location and the volume.

7. The method of claim 6, wherein the third pixel location is further from the first pixel location in screen space than the second pixel location.

8. The method of claim 7, wherein the distance between the depth value at the second pixel location has greater influence on the integral value than the distance between the depth value at the third pixel location and the sphere.

9. A computer-implemented method for modeling ambient occlusion in a graphics scene, the method comprising:
receiving a first pixel location associated with a first depth value stored in a depth buffer;
determining a volume, wherein the volume comprises a sphere centered at the first pixel location;
determining, for each of one or more pixel locations within a screen-space projection of the volume, a statistical model of the depth at an area associated with each of the one or more pixel locations based on one or more depth values stored in the depth buffer;
applying a weight value based on a density function to the depth values for one or more pixel locations based on a calculated distance from the first pixel location and a boundary of the sphere;
calculating an integral based on the statistical model; and
displaying on a display device or storing in a memory a pixel value that is associated with the first pixel location and is based on the integral.

10. The method of claim 9, wherein the pixel value comprises a lighting value.

11. The method of claim 9, wherein the statistical model is based on a mean of depth values and a variance of the depth values stored in the depth buffer over an area defined around one of the one or more pixel locations.

12. The method of claim 11, wherein the variance of the depth values over the area is based on the mean of the depth values and a mean of the depth values squared.

13. The method of claim 9, wherein the statistical model is based on a constant approximation of a Gaussian distribution of depth.

14. The method of claim 9, wherein the statistical model is based on approximating thicknesses of one or more objects in the graphics scene.

15. A computer-readable storage medium storing instructions that, when executed by a processor, cause a computer system to model ambient occlusion, by performing the steps of:
receiving a first pixel location associated with a first depth value stored in a depth buffer;
determining a volume, wherein the volume comprises a sphere;
determining depth values stored in the depth buffer for one or more pixel locations within a screen-space projection of the volume;
applying a weight value based on a density function to the depth values for one or more pixel locations based on their distance from the first pixel location;
calculating a distance using the depth values between each of the one or more pixel locations on the screen space projection and a boundary of the sphere;
calculating an integral value of the distances between depth values at each of the one or more pixel locations and the volume centered at the first pixel location;
adjusting a pixel value at the first pixel location based on the integral value; and
displaying on a display device or storing in a memory a pixel that is associated with the first pixel location and is based on the pixel value.

16. The computer-readable storage medium of claim 15, wherein the pixel value comprises a lighting value.

17. The computer-readable storage medium of claim 15, wherein the one or more pixel locations within the screen-space projection of the volume include all pixel locations within the screen-space projection of the volume.

18. The computer-readable storage medium of claim 15, wherein the one or more pixel locations within the screen-space projection of the volume include a sparse sampling of the pixel locations within the screen-space projection of the volume.

19. The computer-readable storage medium of claim 15, wherein the volume is based on a depth stored in the depth buffer at the first pixel location.

20. The computer-readable storage medium of claim 15, wherein the distance between the depth value at a second pixel location and the volume has a greater weight than the distance between the depth value at a third pixel location and the volume.

21. The computer-readable storage medium of the claim 20, wherein the third pixel location is further from the first pixel location in screen space than the second pixel location.

22. The computer-readable storage medium of claim 21, wherein the distance between the depth value at the second pixel location has greater influence on the integral value than the distance between the depth value at the third pixel location and the sphere.

23. A computer-readable storage medium storing instructions that, when executed by a processor, cause a computer system to model ambient occlusion in a graphics scene, by performing the steps of:
receiving a first pixel location associated with a first depth value stored in a depth buffer;
determining a volume, wherein the volume comprises a sphere;
determining, for each of one or more pixel locations within a screen-space projection of the volume, a statistical model of depth at an area associated with each of the one or more pixel locations based on one or more depth values stored in the depth buffer;
applying a weight value based on a density function to the depth values for one or more pixel locations based on a calculated distance from the first pixel location and a boundary of the sphere;
calculating an integral based on the statistical model; and
displaying on a display device or storing in a memory a pixel value that is associated with the first pixel location and is based on the integral.

24. The computer-readable storage medium of claim 23, wherein the statistical model is based on a mean of depth values and a variance of the depth values stored in the depth buffer over an area defined around one of the one or more pixel locations.

25. The computer-readable storage medium of claim 24, wherein the variance of the depth values over the area is based on the mean of the depth values and a mean of the depth values squared.

26. The computer-readable storage medium of claim 23, wherein the statistical model is based on a constant approximation of a Gaussian distribution of depth.

27. The computer-readable storage medium of claim 23, wherein the statistical model is based on approximating thicknesses of one or more objects in the graphics scene.

28. A system for modeling ambient occlusion, the system comprising:
a processor; and
a memory storing instructions that, when executed by the processor, configure the processor to:
receive a first pixel location associated with a first depth value stored in a depth buffer;

determine a volume, wherein the volume comprises a sphere centered at the first pixel location, determine depth values stored in the depth buffer for one or more pixel locations within a screen-space projection of the volume, apply a weight value based on a density function to the depth values for one or more pixel locations, based on their distance from the first pixel location, calculate a distance using the depth values between each of the one or more pixel locations on the screen space projection and a boundary of the volume centered at the first pixel location, calculate an integral value of the distances between depth values at each of the one or more pixel locations and the volume centered at the first pixel location, adjust a pixel value at the first pixel location based on the integral value, and display on a display device or store in a memory a pixel that is associated with the first pixel location and is based on the pixel value.

29. A system for modeling ambient occlusion in a graphics scene, the system comprising:

a processor; and a memory storing instructions that, when executed by the processor, configure the processor to:

receive a first pixel location associated with a first depth value stored in a depth buffer, determine a volume, wherein the volume comprises a sphere centered at the first pixel location, determine, for each of one or more pixel locations within a screen-space projection of the volume, a statistical model of depth at an area associated with each of the one or more pixel locations based on one or more depth values stored in the depth buffer, apply a weight value based on a density function to the depth values for one or more pixel locations based on a calculated distance from the first pixel location and a boundary of the sphere;

calculate an integral based on the statistical model, and display on a display device or store in a memory a pixel value that is associated with the first pixel location and is based on the integral.

* * * * *